US010589873B1

(12) United States Patent
Lawson et al.

(10) Patent No.: US 10,589,873 B1
(45) Date of Patent: Mar. 17, 2020

(54) STRATIFIED AIRCRAFT ACCESS

(71) Applicant: The Boeing Company, Chicago, IL (US)

(72) Inventors: Jack Lawson, Bellevue, WA (US); Timothy M. Mitchell, Seattle, WA (US); Richard P. Nguyen, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/374,585

(22) Filed: Apr. 3, 2019

(51) Int. Cl.
*B64D 45/00* (2006.01)
*G06N 20/00* (2019.01)

(52) U.S. Cl.
CPC ......... *B64D 45/0015* (2013.01); *G06N 20/00* (2019.01)

(58) Field of Classification Search
None
See application file for complete search history.

(56) References Cited

U.S. PATENT DOCUMENTS

| 4,797,657 | A | * | 1/1989 | Vorzimmer | G08B 13/19 340/430 |
| 7,225,976 | B1 | * | 6/2007 | Moberg | B60R 25/25 235/380 |
| 7,783,081 | B2 | * | 8/2010 | Roques | B64D 45/0015 382/115 |
| 9,082,237 | B2 | * | 7/2015 | Breed | G06K 9/00369 |
| 9,990,785 | B2 | * | 6/2018 | God | G07C 9/00087 |
| 2011/0130112 | A1 | * | 6/2011 | Saigh | H04M 1/7253 455/404.1 |
| 2011/0148574 | A1 | * | 6/2011 | Simon | B60R 25/24 340/5.61 |
| 2014/0019768 | A1 | * | 1/2014 | Pineau | G06F 21/32 713/186 |
| 2014/0306814 | A1 | * | 10/2014 | Ricci | G01C 21/3484 340/425.5 |

(Continued)

OTHER PUBLICATIONS

Author Unknown, "International Standard ISO/IEC 21481 Information technology—telecommunications and information exchange between systems—near field communication interface and protocol-2 (NFCIP-2)," Second edition, Jul. 1, 2012, 10 pages.

*Primary Examiner* — Fekadeselassie Girma
(74) *Attorney, Agent, or Firm* — MH2 Technology Law Group LLP (57) ABSTRACT

Techniques for enforcing stratified aircraft security are presented. The techniques are performed using an aircraft-based authentication and authorization unit and a wireless transceiver, where the authentication and authorization unit includes an electronically stored machine learning classifier. The techniques include: receiving and verifying authentication data for an employee from a mobile access device; receiving employee data from the mobile access device, the employee data including at least information representing an access event of the employee with the aircraft; providing an input to the machine learning classifier, the input including at least aircraft data and the employee data; obtaining an output from the machine learning classifier, the output indicating a level of access authorized; and providing an alert in response to a level of access by the at least one employee for the access event exceeding the level of access authorized.

20 Claims, 3 Drawing Sheets

(56) References Cited

U.S. PATENT DOCUMENTS

| | | | | |
|---|---|---|---|---|
| 2016/0107763 A1* | 4/2016 | Giuliano | ................ | B64D 43/00 |
| | | | | 701/29.1 |
| 2016/0307380 A1* | 10/2016 | Ho | ..................... | G07C 9/00079 |
| 2017/0053108 A1* | 2/2017 | Jakobsson | ............ | H04L 63/0861 |
| 2017/0247000 A1* | 8/2017 | Ricci | .................. | G06K 9/00302 |
| 2017/0327082 A1* | 11/2017 | Kamhi | ............... | B60H 1/00735 |
| 2017/0372059 A1* | 12/2017 | Sindia | ..................... | G06F 21/32 |
| 2019/0020676 A1* | 1/2019 | Laughlin | ............. | H04L 63/1416 |
| 2019/0188508 A1* | 6/2019 | Zebley | ............... | G06K 9/00885 |

* cited by examiner

STRATIFIED AIRCRAFT ACCESS

FIELD

This disclosure relates to security for aircraft such as airplanes.

BACKGROUND

Currently, anyone with physical access to an aircraft has essentially unlimited control over the aircraft. This situation occurs regardless as to the assigned role of such an individual. For example, a mechanic with physical access to an aircraft may take off and fly the aircraft.

SUMMARY

According to various embodiments, a system for stratified aircraft security is provided. The system includes an aircraft-based authentication and authorization unit, the authentication and authorization unit including an electronic processor, an electronic memory, and a wireless transceiver; and a plurality of employee mobile access devices, each mobile access device including an electronic processor, an electronic memory, and a wireless transceiver; where the authentication and authorization unit includes an electronically stored machine learning classifier trained using a training corpus including historic aircraft data and historic employee data; where the authentication and authorization unit is configured to: receive and verify authentication data for an employee from at least one mobile access device; receive employee data from the at least mobile access device, the employee data including at least information representing an access event of the employee with the aircraft; provide an input to the machine learning classifier, the input including at least aircraft data and the employee data; obtain an output from the machine learning classifier, the output indicating a level of access authorized for the at least one employee; and provide an alert in response to a level of access by the at least one employee for the access event exceeding the level of access authorized for the at least one employee.

Various optional features of the above embodiments include the following. The authentication and authorization unit may be further configured to restrict aircraft access in response to the level of access by the at least one employee exceeding the level of access authorized for the at least one employee. The authentication and authorization unit may be further configured to restrict aircraft access by at least one of: preventing entry to the aircraft, preventing engines of the aircraft from exceeding idle, preventing the aircraft from taxiing for more than a predetermined time limit, or preventing engines of the aircraft from exceeding flight idle when the aircraft lacks weight on wheels. The authentication and authorization unit may further include an electronically stored second machine learning classifier trained using a second training corpus including aircraft location data, aircraft fault data, and aircraft system status data; where the authentication and authorization unit is further configured to: provide an input to the second machine learning classifier, the input including at least the employee data; obtain an output from the second machine learning classifier, the output indicating a second level of access authorized for the at least one employee; and provide an alert in response to the level of access by the at least one employee exceeding the second level of access authorized for the at least one employee. The authentication and authorization unit may include an electronically stored third machine learning classifier trained using a third training corpus including aircraft security log data; where the authentication and authorization unit is further configured to: provide an input to the third machine learning classifier, the input including at least the employee data; obtain an output from the third machine learning classifier, the output indicating a third level of access authorized for the at least one employee; and provide an alert in response to the level of access by the at least one employee exceeding the third level of access authorized for the at least one employee. The employee data may further include at least one of: employee location, employee job responsibility, employee shift information, number of employees present on the aircraft, recent employee corrective action, employee credit score, or employee health score. The aircraft data may include at least one of: aircraft location, aircraft tail identification, amount of fuel in the aircraft, aircraft speed, aircraft thrust setting, aircraft flaps setting, aircraft aileron setting, aircraft stabilizers setting, aircraft service bulletins, air traffic control system departure schedule, aircraft departure gate, airline hanger location, aircraft maintenance messages, or aircraft airworthiness directives. The input may further include other data, the other data including at least one of: time of day, network availability, airport security status, identification of lost mobile access devices, or weather data. The input may further include unstructured data, the unstructured data including at least one of: news reports or trending social media data. The authentication and authorization unit may be configured to provide the alert to at least a service desk for the aircraft.

According to various embodiments, a method of enforcing stratified aircraft security is presented. The method is performed using an aircraft-based authentication and authorization unit, the authentication and authorization unit including an electronic processor, an electronic memory, and a wireless transceiver, where the authentication and authorization unit includes an electronically stored machine learning classifier trained using a training corpus including historic aircraft data and historic employee data. The method includes: receiving and verifying, by the authentication and access unit, authentication data for an employee from a mobile access device including an electronic processor, an electronic memory, and a wireless transceiver; receiving, by the authentication and access unit, employee data from the mobile access device, the employee data including at least information representing an access event of the employee with the aircraft; providing, by the authentication and access unit, an input to the machine learning classifier, the input including at least aircraft data and the employee data; obtaining, by the authentication and access unit, an output from the machine learning classifier, the output indicating a level of access authorized for the at least one employee; and providing, by the authentication and access unit, an alert in response to a level of access by the at least one employee for the access event exceeding the level of access authorized for the at least one employee.

Various optional features of the above embodiments include the following. The method may include restricting aircraft access in response to the level of access by the at least one employee exceeding the level of access authorized for the at least one employee. The restricting aircraft access may include at least one of: preventing entry to the aircraft, preventing engines of the aircraft from exceeding idle, preventing the aircraft from taxiing for more than a predetermined time limit, or preventing engines of the aircraft from exceeding flight idle when the aircraft lacks weight on wheels. The authentication and authorization unit may further include an electronically stored second machine learning classifier trained using a second training corpus including aircraft location data, aircraft fault data, and aircraft system status data, the method further including: providing an input to the second machine learning classifier, the input including at least the employee data; obtaining an output from the second machine learning classifier, the output indicating a second level of access authorized for the at least one employee; and providing an alert in response to the level of access by the at least one employee exceeding the second level of access authorized for the at least one employee. The authentication and authorization unit may include an electronically stored third machine learning classifier trained using a third training corpus including aircraft security log data, the method further including: providing an input to the third machine learning classifier, the input including at least the employee data; obtaining an output from the third machine learning classifier, the output indicating a third level of access authorized for the at least one employee; and providing an alert in response to the level of access by the at least one employee exceeding the third level of access authorized for the at least one employee. The employee data may further include at least one of: employee location, employee job responsibility, employee shift information, number of employees present on the aircraft, recent employee corrective action, employee credit score, or employee health score. The aircraft data may include at least one of: aircraft location, aircraft tail identification, amount of fuel in the aircraft, aircraft speed, aircraft thrust setting, aircraft flaps setting, aircraft aileron setting, aircraft stabilizers setting, aircraft service bulletins, air traffic control system departure schedule, aircraft departure gate, airline hanger location, aircraft maintenance messages, or aircraft airworthiness directives. The input may further include other data, the other data including at least one of: time of day, network availability, airport security status, identification of lost mobile access devices, or weather data. The input may further include unstructured data, the unstructured data including at least one of: news reports or trending social media data. The providing the alert may include providing the alert to at least a service desk for the aircraft.

BRIEF DESCRIPTION OF THE DRAWINGS

The accompanying drawings, which are incorporated in and constitute a part of this specification, illustrate the present teachings and together with the description, serve to explain the principles of the disclosure.

It should be noted that some details of the figures have been simplified and are drawn to facilitate understanding of the present teachings, rather than to maintain strict structural accuracy, detail, and scale.

DETAILED DESCRIPTION

Reference will now be made in detail to the disclosed examples, which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific examples. These examples are described in sufficient detail to enable those skilled in the art to practice them and it is to be understood that other examples may be utilized and that changes may be made without departing from the scope of the disclosure. The following description is, therefore, merely exemplary.

Some embodiments solve the problem of aircraft access according to employee assigned role. Some embodiments include one or more user mobile devices, which transmit user authentication information to an authentication and authorization unit on board the aircraft. The mobile devices may be in the form of a smartcard or key fob, for example. The mobile devices may utilize cryptography and may be capable of being disabled remotely from a central control, e.g., a service desk. Further, the mobile devices may utilize user biometrics to confirm user identity.

Such embodiments further include the authentication and authorization unit, which receives and verifies data from the mobile devices. The authentication and authorization unit may restrict access and execute a range of allowed commands based on assigned user roles based on, e.g. time of day, aircraft tail number, location, and various other parameters. For example, pilots may be allowed to start the engines or power the aircraft greater than a certain speed, mechanics may be allowed to replace parts, connect diagnostic equipment to aircraft interfaces, and taxi aircraft, but not take off.

Figure 1:
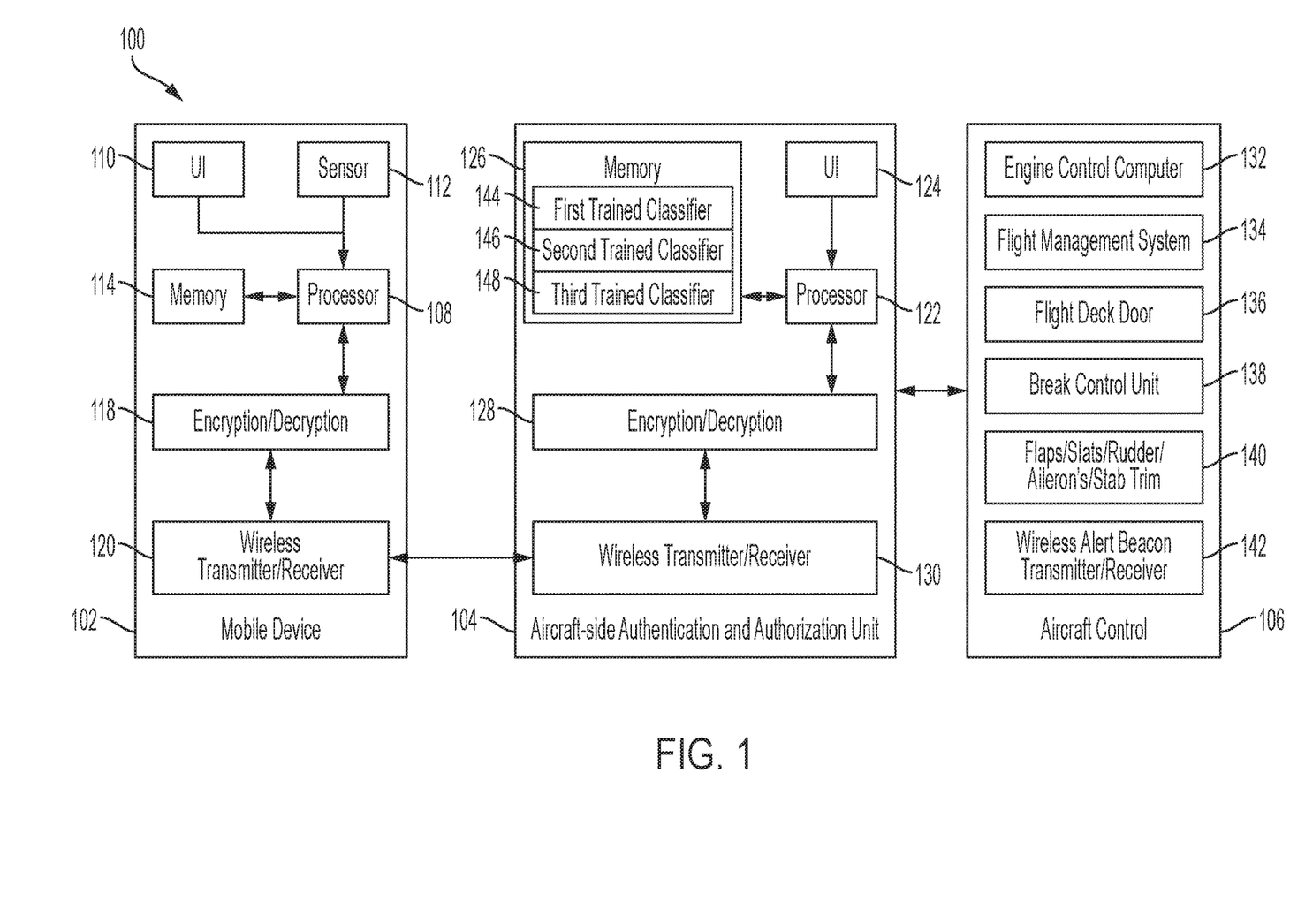
FIG. 1 is a schematic diagram of a system for stratified aircraft access according to various embodiments.

FIG. 1 is a schematic diagram of a system 100 for stratified aircraft access according to various embodiments. As shown in FIG. 1, the system 100 includes at least one mobile device 102 and an on-board authentication and authorization unit 104, which may interface with a control system 106 for the aircraft.

The mobile device 102 may be in the form of a smart card, a key fob, or a smart phone, for example. The mobile device 102 includes an electronic processor 108, which is communicatively coupled to electronic persistent memory 114. The memory 114 stores program instructions that the processor may execute to carry out the methods disclosed herein. The processor is also communicatively coupled to a user interface 110 and a sensor 112. The user interface may take the form of a touch screen according to some embodiments. The sensor 112 may be a biometric sensor according to various embodiments, e.g., a fingerprint sensor, a facial recognition camera, an iris recognition camera, or a microphone for voice recognition. The processor 108 is further communicatively coupled to a wireless transmitter/receiver 120 by way of an encryption/decryption module 118. The wireless transmitter/receiver may be a WiFi transceiver, a near-field communications transceiver, or a Bluetooth transceiver according to various embodiments. The encryption/decryption module 118 may be configured to automatically encrypt and decrypt traffic between the mobile device 102 and the authentication and authorization unit 104. For example, the encryption/decryption module may share a symmetric key with the authentication and authorization unit 104 and use the key to encrypt sent traffic and decrypt received traffic.

Each mobile device 102 is intended to be associated with, and carried by, an employee, such as a mechanic, a flight attendant, or a pilot. Each mobile device stores information regarding its associated employee in its respective memory 114. The stored information may include an identification of the employee as well as an identification of the employee's role. Each mobile device 102 may be capable of being disabled via a command sent from a service desk. More particularly, each mobile device 102 may be capable of being disassociated from its employee. In such instances, the association of the mobile device 102 with the employee is revoked. Such revocation may be implemented, e.g., when the employee no longer works for the airline, is suspended, or is otherwise no longer authorized to be in proximity to the aircraft.

The authentication and authorization unit 104 includes an electronic processor 122, which is communicatively coupled to electronic persistent memory 126. The memory 126 stores program instructions that the processor may execute to carry out the methods disclosed herein. The processor is also communicatively coupled to a user interface 124. The user interface may include a keyboard together with a computer monitor, for example. The processor 122 is further communicatively coupled to a wireless transmitter/receiver 130 through an encryption/decryption module 128. The wireless transmitter/receiver 130 may be a WiFi transceiver, a near-field communications transceiver, or a Bluetooth transceiver according to various embodiments. The encryption/decryption module 128 may be configured to automatically encrypt and decrypt traffic sent to and received from the mobile device 102. For example, the encryption/decryption module 128 may share a symmetric key with the mobile device 102 and use such key to encrypt sent traffic and decrypt received traffic.

According to various embodiments, the memory 126 further stores at least three trained machine learning classifiers 144, 146, 148. The trained machine learning classifiers 144, 146, 148 may be of various types, such as by way of non-limiting examples, support vector machines, neural networks, or decision trees. The classifiers 144, 146, 148 may be trained according to their respective machine learning algorithms on a separate computer before being installed in the authentication and authorization unit 104. Each of the machine learning classifiers 144, 146, 148 is trained to classify employee access events with an aircraft according to a level of access. However, each of the machine learning classifiers 144, 146, 148 is trained using a different corpus of training data. More particularly, each machine learning classifier 144, 146, 148 is trained using a corpus of training data that includes historic information representing various authorized aircraft access events and various unauthorized aircraft access events, classified accordingly. The training algorithms produce trained machine learning classifiers, which can classify novel access event data according to level of access. These trained machine learning classifiers are stored in the memory 126.

According to some embodiments, a first machine learning classifier 144 is trained using historic aircraft security log data. In general, aircraft maintain on-board electronically stored security logs. Aircraft security logs are mandated in the U.S. by the Federal Aviation Administration (FAA) and represent actions and events with respect to the aircraft. The security log data may be obtained from aircraft of the same type as the aircraft that includes the authentication and authorization unit 104, according to some embodiments. Such security logs include a large amount of information. This information may be formatted and classified according to level of access for digestion by the respective machine learning algorithm. Thus, the training corpus for the first machine learning classifier 144 includes classified aircraft security log data.

According to some embodiments, a second machine learning classifier 146 is trained using historic general aircraft data, aircraft environment data, aircraft fault data, and aircraft system response data. Such data may include, for example, aircraft location (e.g., relative to a gate or hanger), aircraft tail identification, amount of fuel in the aircraft, aircraft speed, aircraft thrust setting, aircraft flaps setting, aircraft aileron setting, aircraft stabilizers setting, aircraft service bulletins, air traffic control system departure schedule, aircraft departure gate, airline hanger location, aircraft maintenance messages, and/or aircraft airworthiness directives. The data may be formatted and classified according to level of access in order to generate a training corpus for a machine learning algorithm.

According to some embodiments, a third machine learning classifier 148 is trained using historic general aircraft data, aircraft environment data, and employee data. Such data may include any of the data used for the training corpus for the second machine learning classifier 146, together with employee data, such as, for example, employee location (e.g., relative to an aircraft), employee job responsibility (i.e., role), employee shift information (e.g., time interval), number of employees present on the aircraft, recent employee corrective action, employee credit score, and/or employee health score. This information may be formatted and classified according to level of access for use as a training corpus by the respective machine learning algorithm.

The system 100 interfaces with a control system 106 of the aircraft. The control system 106 gathers aircraft data and is capable of disabling one or more aircraft subsystems. According to various embodiments, the aircraft control system 106 includes an engine control computer 132, a flight management system 134, a flight deck door sensor and lock 136, a break control unit 138, and controls and monitors 140 for various aircraft flight control surfaces such as flaps, slats, rudder, aileron, and/or stabilizers, and a wireless alert beacon transceiver 142. The authentication and authorization unit 104 interfaces with the aircraft control unit both to gather data relevant to a novel access event and to disable or attenuate various aircraft systems in response to an unauthorized access event, that is, an access event with a corresponding level of access that exceeds an authorized level of access.

Figure 2:
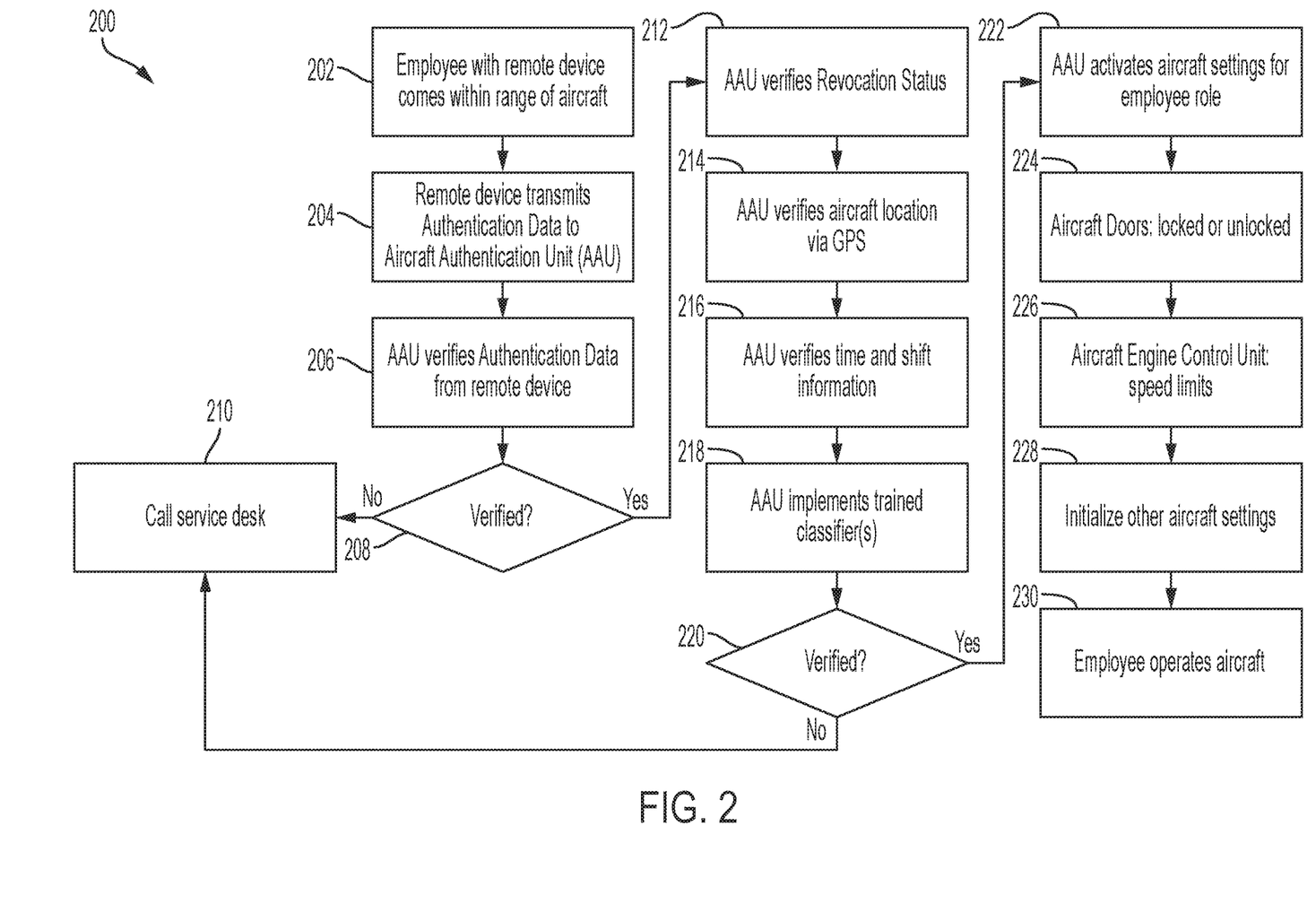
FIG. 2 is flow diagram of a method for stratified aircraft access according to various embodiments.

FIG. 2 is flow diagram of a method 200 for stratified aircraft access according to various embodiments. The method 200 may be implemented using the system 100 for stratified aircraft access. In particular, the method 100 may be executed when the aircraft is on the ground.

At block 202, the authentication and authorization unit 104 detects a proximity of an employee to the aircraft. According to some embodiments, the wireless transmitter/receiver 130 may detect the proximity of the employee's mobile device 102 via its respective wireless transmitter/receiver 120. The detection is not limited to the employee being on board the aircraft; some embodiments detect when the employee is outside of, but close to, the aircraft. The range of the detection is limited, according to some embodiments, to the range of the wireless transmitter/receivers 120, 130. According to other embodiments, the proximity of the employee to the aircraft is detected using a GPS device that forms part of the mobile device 102.

At block 204, the employee's mobile device transmits authentication data to the authentication and authorization unit 104. Such authentication data may include information that uniquely identifies the employee. For example, the authentication data may include a unique employee number or code. As another example, the authentication data may include biometric information that the employee provides to their respective mobile device. Such biometric information may include fingerprint information, facial recognition information, voice recognition information and/or iris recognition information. The employee may be required to enter such information on a daily basis, or whenever the employee is proximate to the aircraft, according to various embodiments. For example, when the authentication and authorization unit 104 detects the proximity of the employee per block 202, it may send a command to the employee's mobile device 102 such that the mobile device 102 prompts the employee to enter biometric information.

At block 206, the authentication and authorization unity 104 verifies the authentication data received at block 206. The verification process may include matching the unique employee number or code to a stored list of such data. Alternately, or in addition, the verification process may include matching biometric information to corresponding information stored in the memory 126 of the authentication and authorization unity 104.

Per block 220, if the authentication data is not verified, then control passes to block 210. At block 210, the authentication and authorization unit 204 sends an alert to a respective service desk. The service desk may be a dedicated facility at the airport for handling aircraft security matters, for example. The alert may be sent to a computer at the service desk, e.g., by email or text message. The alert may specify the location of the employee and/or aircraft. A security employee may receive the alert and take corrective action, e.g., sending a security team to intercept the employee.

If, per block 220, the authentication data is verified, then control passes to block 212.

At block 212, the authentication and authorization unit 104 verifies the revocation status of the employee's mobile device 102. In general, the association between the employee and the mobile device 102 may be remotely revoked from the service desk. This block verifies whether the revocation status is "active" or "revoked". If revoked, then the method 200 may terminate, possibly with a call to the service desk at block 210. Otherwise, control passes to block 214. In either case, the revocation status is temporarily stored in memory for potential later use with one or more of the trained machine learning classifiers.

At block 214, the authentication and authorization unity 104 verifies the location of the aircraft. The actions of this block include the authentication and authorization unit 104 determining a location of the aircraft. The authentication and authorization unit may utilize a GPS unit, either a component of the authentication and authorization unit 104, or a GPS unit on-board the aircraft, to determine such location. The location information is temporarily stored in memory for potential later use with one or more of the trained machine learning classifiers.

At 216, the authentication and authorization unit 104 verifies time and shift information. The actions of this block include the authentication and authorization unit 104 retrieving a current time as well as intended shift information for the employee detected per block 202. The time information may be obtained from an electronic clock that forms part of the authentication and authorization unit 104, and the shift information may be obtained from an electronic store, e.g., held by the respective airline.

At 218, the authentication and authorization unit 104 implements one or more trained classifiers 144, 146, 148. To do so, the authentication and authorization unit formats an input for each respective trained classifier 144, 146, 148. The inputs each represent an access event by the employee of the aircraft. More particularly, the inputs include employee data, such as one or more of: employee location (e.g., as determined by the mobile device 102), employee job responsibility, employee shift information (e.g., as determined per block 216), number of employees present on the aircraft (e.g., as determined by mobile devices of other employees), recent employee corrective action, employee credit score, and employee health score. Regarding the employee health score, note that pilots may be required to have an annual physical exam, and engineers may be required to have a current medical questionnaire on record and pass an emergency training course to participate in flight testing. Employees may be required to have a minimum health score they can participate in high speed (e.g., 80% of maximum thrust) engine runs. The inputs also include aircraft data, such as one or more of: aircraft location (e.g., as determined per block 214), aircraft tail identification, amount of fuel in the aircraft, aircraft speed, aircraft thrust setting, aircraft flaps setting, aircraft aileron setting, aircraft stabilizers setting, aircraft service bulletins, air traffic control system departure schedule, aircraft departure gate, airline hanger location, aircraft maintenance messages, and aircraft airworthiness directives. The inputs may also include other data, such as one or more of: time of day (e.g., as determine per block 216), network availability, airport security status, identification of lost mobile access devices, and weather data. The inputs may also include unstructured data, such as news reports and/or trending social media data.

Once the inputs are formatted, the actions of block 218 include providing the formatted inputs to one or more of the trained classifiers 144, 146, 148. The trained classifiers 144, 146, 148 each respond with an output that indicates a level of access authorized for the employee given all of the information in the formatted input. Levels of access include, by way of non-limiting example, the following, listed from low-level to high-level: enter aircraft, start aircraft engine(s) and idle (but not above idle), start aircraft engine(s) and low-speed taxi idle (but not above taxi idle), start engine and high-speed taxi with a time limit (e.g., 30 seconds), start engine and high speed taxi with weight on wheels (and possibly reduce to flight idle if there is no weight on wheels), and start engine, high speed taxi, and flight (i.e., no restrictions). Note that the trained classifiers 144, 146, 148 may out output data, e.g., numerals, representing these and other levels of access.

At block 220, once the authorization and authentication unit 104 obtains an authorized level of access for the employee using the trained classifiers 144, 146, 148, it proceeds to compare the authorized level of access to the level of access of the actual employee/aircraft access event. In particular, the authorization and authentication unit 104 determines whether the employee's actual level of access, as represented by the data gathered in the preceding blocks, exceeds the authorized level of access as output by the trained classifiers 144, 146, 148. If so, then control passes to block 210, where an alert is sent, e.g., to the service desk. Otherwise, control passes to block 222. The actions of blocks 222, 224, 226, 228, and 230 represent actions taken when the employee's level of access is authorized. Nevertheless, the actions of blocks 222, 224, 226, 228, and 230 may include restricting aircraft access at least partially.

At block 222, the authentication and authorization unit 104 activates aircraft settings appropriate for the authorized level of access. The actions of this block may include, for example, the authentication and authorization unit 104 interfacing with the aircraft control system 106. Such interfacing may include establishing a secure command and control link, for example.

At block 224, the authentication and authorization unit 104 locks or unlocks the aircraft doors consistent with the authorized level of access. Such doors may include external doors and/or flight deck doors.

At block 226, the authentication and authorization unit 104 sets a limit on the aircraft speed consistent with the authorized level of access. Such limits may include limits on the engine speed for weight-on-wheels and/or for no weight-on-wheels.

At block 228, the authentication and authorization unit 104 initializes other aircraft settings appropriate for the authorized level of access. Such additional settings may include, for example, limitations on settings for aircraft flight control surfaces, such as flaps, slats, rudder, aileron, and/or stabilizers.

At block 230, the employee may proceed to operate the aircraft consistent with the limitations imposed by the previous blocks. The system 100 may continue to operate and implement the method 200. The method 200 may be re-initiated, for example, whenever the actual employee access event changes, e.g., when the employee accesses or attempts to access an additional aircraft structure or function.

Figure 3:
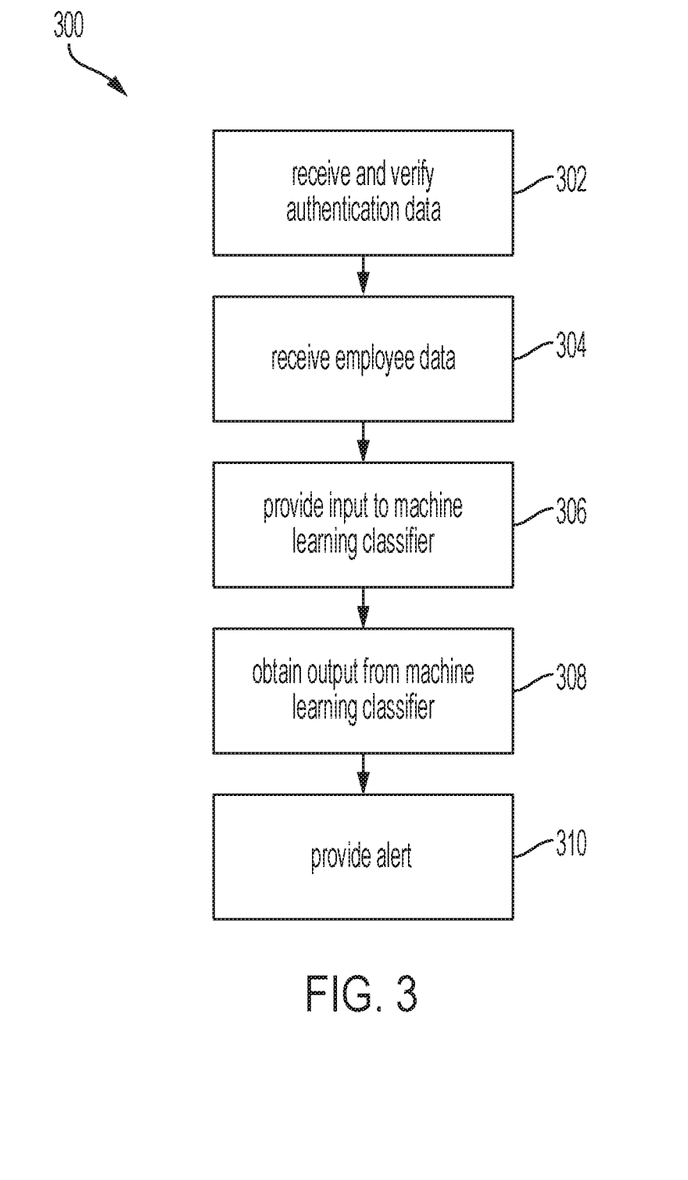
FIG. 3 is a flow diagram of a method for stratified aircraft access according to various embodiments.

FIG. 3 is a flow diagram of a method 300 for stratified aircraft access according to various embodiments. The method 300 may be implemented using the system 100. According to some embodiments, the method 300 represents an implementation of the method 200.

At block 302, the authentication and authorization unit 104 receives and verifies authentication data for an employee. The data may be received from a mobile access device 102 associated with the employee.

At block 304, the authentication and authorization unit 104 receives employee data from the mobile access device. The employee data may include information representing an access event of the employee with the aircraft.

At block 306, the authentication and authorization unit 104 provides an input to at least one machine learning classifier. The input may include at least the employee data of block 304. The input may further include aircraft data, other data (e.g., one or more of time of day, network availability, airport security status, identification of lost mobile access devices, or weather data) and/or unstructured data.

At block 308, the authentication and authorization unit 104 obtains an output from the machine learning classifier. The output indicates a level of access authorized for the employee.

At block 310, the authentication and authorization unit 104 provides an alert in response to a level of access by the at least one employee for the access event exceeding the level of access authorized for the at least one employee. If the level of access by the at least one employee for the access event does not exceed the level of access authorized for the at least one employee, then the method 300 may proceed to activate aircraft settings for the employee's role.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system for stratified aircraft security, the system comprising:
an aircraft-based authentication and authorization unit, the authentication and authorization unit comprising an electronic processor, an electronic memory, and a wireless transceiver; and
a plurality of employee mobile access devices, each mobile access device comprising an electronic processor, an electronic memory, and a wireless transceiver;
wherein the authentication and authorization unit comprises an electronically stored machine learning classifier trained using a training corpus comprising historic aircraft data and historic employee data;
wherein the authentication and authorization unit is configured to:
receive and verify authentication data for an employee from at least one mobile access device;
receive employee data from the at least mobile access device, the employee data comprising at least information representing an access event of the employee with the aircraft;
provide an input to the machine learning classifier, the input comprising at least aircraft data and the employee data;
obtain an output from the machine learning classifier, the output indicating a level of access authorized for the at least one employee; and
provide an alert in response to a level of access by the at least one employee for the access event exceeding the level of access authorized for the at least one employee.

2. The system of claim 1, wherein the authentication and authorization unit is further configured to restrict aircraft access in response to the level of access by the at least one employee exceeding the level of access authorized for the at least one employee.

3. The system of claim 2, wherein the authentication and authorization unit is further configured to restrict aircraft access by at least one of: preventing entry to the aircraft, preventing engines of the aircraft from exceeding idle, preventing the aircraft from taxiing for more than a predetermined time limit, or preventing engines of the aircraft from exceeding flight idle when the aircraft lacks weight on wheels.

4. The system of claim 1, wherein the authentication and authorization unit further comprises an electronically stored second machine learning classifier trained using a second training corpus comprising aircraft location data, aircraft fault data, and aircraft system status data;
wherein the authentication and authorization unit is further configured to:
provide an input to the second machine learning classifier, the input comprising at least the employee data;
obtain an output from the second machine learning classifier, the output indicating a second level of access authorized for the at least one employee; and
provide an alert in response to the level of access by the at least one employee exceeding the second level of access authorized for the at least one employee.

5. The system of claim 1, wherein the authentication and authorization unit comprises an electronically stored third machine learning classifier trained using a third training corpus comprising aircraft security log data;
wherein the authentication and authorization unit is further configured to:
provide an input to the third machine learning classifier, the input comprising at least the employee data;
obtain an output from the third machine learning classifier, the output indicating a third level of access authorized for the at least one employee; and
provide an alert in response to the level of access by the at least one employee exceeding the third level of access authorized for the at least one employee.

6. The system of claim 1, wherein the employee data further comprises at least one of: employee location, employee job responsibility, employee shift information, number of employees present on the aircraft, recent employee corrective action, employee credit score, or employee health score.

7. The system of claim 1, wherein the aircraft data comprises at least one of: aircraft location, aircraft tail identification, amount of fuel in the aircraft, aircraft speed, aircraft thrust setting, aircraft flaps setting, aircraft aileron setting, aircraft stabilizers setting, aircraft service bulletins, air traffic control system departure schedule, aircraft departure gate, airline hanger location, aircraft maintenance messages, or aircraft airworthiness directives.

8. The system of claim 1, wherein the input further comprises other data, the other data comprising at least one of: time of day, network availability, airport security status, identification of lost mobile access devices, or weather data.

9. The system of claim 1, wherein the input further comprises unstructured data, the unstructured data comprising at least one of: news reports or trending social media data.

10. The system of claim 1, wherein the authentication and authorization unit is configured to provide the alert to at least a service desk for the aircraft.

11. A method of enforcing stratified aircraft security, the method performed using an aircraft-based authentication and authorization unit, the authentication and authorization unit comprising an electronic processor, an electronic memory, and a wireless transceiver, wherein the authentication and authorization unit comprises an electronically stored machine learning classifier trained using a training corpus comprising historic aircraft data and historic employee data, the method comprising:
receiving and verifying, by the authentication and access unit, authentication data for an employee from a mobile access device comprising an electronic processor, an electronic memory, and a wireless transceiver;
receiving, by the authentication and access unit, employee data from the mobile access device, the employee data comprising at least information representing an access event of the employee with the aircraft;
providing, by the authentication and access unit, an input to the machine learning classifier, the input comprising at least aircraft data and the employee data;
obtaining, by the authentication and access unit, an output from the machine learning classifier, the output indicating a level of access authorized for the at least one employee; and
providing, by the authentication and access unit, an alert in response to a level of access by the at least one employee for the access event exceeding the level of access authorized for the at least one employee.

12. The method of claim 11, further comprising restricting aircraft access in response to the level of access by the at least one employee exceeding the level of access authorized for the at least one employee.

13. The method of claim 12, wherein the restricting aircraft access comprises at least one of: preventing entry to the aircraft, preventing engines of the aircraft from exceeding idle, preventing the aircraft from taxiing for more than a predetermined time limit, or preventing engines of the aircraft from exceeding flight idle when the aircraft lacks weight on wheels.

14. The method of claim 11, wherein the authentication and authorization unit further comprises an electronically stored second machine learning classifier trained using a second training corpus comprising aircraft location data, aircraft fault data, and aircraft system status data, the method further comprising:
   providing an input to the second machine learning classifier, the input comprising at least the employee data;
   obtaining an output from the second machine learning classifier, the output indicating a second level of access authorized for the at least one employee; and
   providing an alert in response to the level of access by the at least one employee exceeding the second level of access authorized for the at least one employee.

15. The method of claim 11, wherein the authentication and authorization unit comprises an electronically stored third machine learning classifier trained using a third training corpus comprising aircraft security log data, the method further comprising:
   providing an input to the third machine learning classifier, the input comprising at least the employee data;
   obtaining an output from the third machine learning classifier, the output indicating a third level of access authorized for the at least one employee; and
   providing an alert in response to the level of access by the at least one employee exceeding the third level of access authorized for the at least one employee.

16. The method of claim 11, wherein the employee data further comprises at least one of: employee location, employee job responsibility, employee shift information, number of employees present on the aircraft, recent employee corrective action, employee credit score, or employee health score.

17. The method of claim 11, wherein the aircraft data comprises at least one of: aircraft location, aircraft tail identification, amount of fuel in the aircraft, aircraft speed, aircraft thrust setting, aircraft flaps setting, aircraft aileron setting, aircraft stabilizers setting, aircraft service bulletins, air traffic control system departure schedule, aircraft departure gate, airline hanger location, aircraft maintenance messages, or aircraft airworthiness directives.

18. The method of claim 11, wherein the input further comprises other data, the other data comprising at least one of: time of day, network availability, airport security status, identification of lost mobile access devices, or weather data.

19. The method of claim 11, wherein the input further comprises unstructured data, the unstructured data comprising at least one of: news reports or trending social media data.

20. The method of claim 11, wherein the providing the alert comprising providing the alert to at least a service desk for the aircraft.

* * * * *